US010925290B2

(12) United States Patent
Lytle et al.

(10) Patent No.: US 10,925,290 B2
(45) Date of Patent: Feb. 23, 2021

(54) APPARATUS AND METHOD FOR IMPROVING THE HYGIENE OF POULTRY PROCESSING

(71) Applicant: MOY PARK LIMITED, Craigavon (GB)

(72) Inventors: Andrew Lytle, Craigavon (GB); Paul Gardiner, Craigavon (GB)

(73) Assignee: Moy Park Ltd., Craigavon (GB)

( * ) Notice: Subject to any disclaimer, the term of this patent is extended or adjusted under 35 U.S.C. 154(b) by 213 days.

(21) Appl. No.: 16/075,471

(22) PCT Filed: Dec. 3, 2015

(86) PCT No.: PCT/GB2015/053705
§ 371 (c)(1),
(2) Date: Aug. 3, 2018

(87) PCT Pub. No.: WO2016/087866
PCT Pub. Date: Jun. 9, 2016

(65) Prior Publication Data
US 2019/0037864 A1 Feb. 7, 2019

(30) Foreign Application Priority Data
Dec. 3, 2014 (GB) ...................... 1421501

(51) Int. Cl.
*A22C 21/00* (2006.01)
*A22C 21/04* (2006.01)
*A23B 4/005* (2006.01)
*A22C 17/08* (2006.01)
*A22C 18/00* (2006.01)

(52) U.S. Cl.
CPC .......... *A22C 21/0061* (2013.01); *A22C 17/08* (2013.01); *A22C 21/04* (2013.01); *A23B 4/005* (2013.01); *A22C 18/00* (2013.01)

(58) Field of Classification Search
CPC ...... A22C 21/00; A22C 21/0061; A22C 21/04
USPC ................... 452/81, 114, 120, 123, 173, 198
See application file for complete search history.

(56) References Cited

U.S. PATENT DOCUMENTS

| 3,703,021 A | * | 11/1972 | Sharp ..................... A22C 21/04 452/77 |
| 5,178,890 A | * | 1/1993 | van den Nieuwelaar ................... A22C 21/0061 134/25.3 |
| 5,439,694 A | * | 8/1995 | Morris, Jr. ........... A23B 4/0053 426/511 |
| 5,888,132 A | * | 3/1999 | Burnett .................... A22B 3/06 452/141 |
| 5,938,519 A | * | 8/1999 | Wright ................... A22C 21/04 452/173 |
| 5,939,115 A | | 8/1999 | Kounev |

(Continued)

FOREIGN PATENT DOCUMENTS

| GB | 2240912 A | 8/1991 |
| WO | PCT/GB2015/053705 | 9/2016 |
| WO | PCT/GB2015/053705 | 6/2017 |

*Primary Examiner* — Richard T Price, Jr.
(74) *Attorney, Agent, or Firm* — Luke Charles Holst; McGrath North Mullin & Kratz, PC LLO (57) ABSTRACT

Methods of reducing surface microbial contamination of a poultry carcass comprising subjecting the poultry carcass which has previously been scalded and de-feathered to hot water of between 50° C. and 95° C. for between 1 second and 120 seconds; and related apparatus.

20 Claims, 7 Drawing Sheets (56) References Cited

U.S. PATENT DOCUMENTS

| | | | | |
|---|---|---|---|---|
| 5,980,375 A | * | 11/1999 | Anderson | A22B 5/0082 |
| | | | | 452/77 |
| 6,103,286 A | | 8/2000 | Gutzmann | |
| 6,605,308 B2 | * | 8/2003 | Shane | A23B 4/24 |
| | | | | 134/25.3 |
| 8,572,864 B2 | * | 11/2013 | Wieck | A22B 5/0082 |
| | | | | 34/381 |
| 2004/0147211 A1 | * | 7/2004 | Mostoller | A22C 21/022 |
| | | | | 452/82 |
| 2005/0118940 A1 | * | 6/2005 | Hilgren | A01N 37/16 |
| | | | | 452/173 |
| 2006/0199486 A1 | * | 9/2006 | Briel | A22B 5/08 |
| | | | | 452/74 |
| 2006/0205333 A1 | * | 9/2006 | Zachariassen | A22C 21/04 |
| | | | | 452/74 |
| 2009/0042496 A1 | * | 2/2009 | Kjeldsen | A22C 21/04 |
| | | | | 452/76 |
| 2009/0215368 A1 | * | 8/2009 | Van Den Griend | A22B 5/08 |
| | | | | 452/77 |
| 2010/0317271 A1 | * | 12/2010 | Roth | A22C 21/0061 |
| | | | | 452/71 |

\* cited by examiner

APPARATUS AND METHOD FOR IMPROVING THE HYGIENE OF POULTRY PROCESSING

BACKGROUND

Commercial producers of poultry meat are faced with the challenge of reducing contamination of poultry meat with microbes. Although many microbes are easily killed by proper cooking of food and therefore represents a low risk to consumer health if raw poultry meat is correctly handled and fully cooked, they remain responsible for a significant number of food poisoning cases per year. The poultry producing industry has therefore long been working to reduce the levels of surface contamination of poultry meat with microbes. There exists a need to further this objective in a way which is applicable to efficient industrial processing of poultry meat.

An industrial poultry processing line typically uses an overhead conveyor to transport stunned and killed birds, which are hung by their feet in shackles, through each of the processing steps required to produce a whole bird carcass suitable for chilling or freezing for sale to the consumer or for further processing to produce a prepared or partially prepared food product.

On a typical poultry processing line the stunned and killed birds are subjected to a scalding process wherein they are briefly immersed in a bath of hot water, in order to loosen the feathers from the skin, before being removed from the scald bath to be plucked of feathers, typically by an automated or mechanical process. The birds are then carried to further stations to be eviscerated, whereby the vent is opened and the internal organs are removed. Carcasses can become contaminated at this stage in the procedure through spillages of the content of the intestines and thus release of enteric organisms, or by improper implementation of hygiene procedures by poultry workers, where evisceration is carried out by hand, or they may be contaminated prior to evisceration. Carcasses are then rinsed, typically using a shower or spray with cold water of drinking quality in order to reduce the quantity of microorganisms on the surfaces of the carcass. Rinsing should be carried out thoroughly both inside and outside of the carcass to wash away dirt and microbial contamination.

Attempts have been made to use the scald bath to kill microbial contamination in addition to its primary role of feather loosening. For example U.S. Pat. No. 4,766,646 teaches supplementing the scald water with a microbiocidal polyformate salt. However, the use of the existing scald bath of a poultry processing line to reduce microbial contamination has a number of drawbacks and limitations. Firstly, the water of a scald bath is typically between 50° C. and 58° C., which may not be hot enough to kill a sufficient number of organisms. Increasing the temperature risks damaging the aesthetic appearance, for example what is known as the "retail bloom" of the carcass by cooking or scorching it during the approximately 4 minutes scald time typically used to loosen feathers. Melting and loss of subcutaneous fat is also a concern as this can result in a small but significant product weight loss with obvious economic consequences. Secondly, the scald bath is situated on the processing line before the evisceration step so that, even if it does succeed in decontaminating the carcass, there is a risk that the carcass will become re-contaminated during the evisceration stage, when gut contents may be spilled. Thirdly, the scald bath may become contaminated rapidly with feathers, dirt and microbes from the incoming birds and this may actually serve to spread contamination over more carcasses. There is clear merit in improving the hygiene of the scald step and several attempts to do that have been proposed, for example U.S. Pat. No. 3,703,021 which proposes a method wherein the scald water used on one bird is not re-used on other birds, and U.S. Pat. No. 2,727,273 which uses steam scalding as an alternative to hot water immersion. However, the present invention is based, in part, on the realisation that the best that can realistically be expected from such attempts to improve hygiene of the scalding process may be to limit the potential detrimental effects that scalding may have on food hygiene, rather than positively improve hygiene.

The present invention is based, in part, on the recognition that, despite hygiene precautions being taken during the scalding, de-feathering, evisceration and rinsing steps, there is a need to reduce microbial contamination of the carcass surfaces further in a way which is acceptable to consumers and regulators and which fits with the technical and financial requirements of an automated poultry processing plant.

SUMMARY OF INVENTION

Accordingly, there is provided in a first aspect of the invention a method of reducing surface microbial contamination of a poultry carcass comprising subjecting the poultry carcass, which has been previously scalded and de-feathered to hot water of between 50° C. and 95° C. for between 1 second and 120 seconds.

According to a second aspect of the invention there is provided apparatus for reducing surface microbial contamination of poultry carcasses comprising a scald bath station, a de-feathering station, an evisceration station, a rinse station and an overhead conveyor for conveying successively poultry carcasses through each station, characterised in that the apparatus further comprises a decontamination bath adapted to contain hot water of between 50° C. and 75° C. and wherein the overhead conveyor is arranged to convey the defeathered poultry carcasses into, through and out of the decontamination bath such that the carcasses are each immersed for a time period of between 20 seconds and 120 seconds.

DETAILED DESCRIPTION

There is provided in a first aspect of the invention a method of reducing surface microbial contamination of a poultry carcass comprising subjecting the poultry carcass, which has been previously scalded and de-feathered to hot water of between 50° C. and 95° C. for between 1 second and 120 seconds. According to certain preferred embodiments the carcass is subjected to hot water by being immersed into hot water. Preferably, the immersion is into hot water of between 50° C. and 75° C. for between 20 seconds and 120 seconds, more preferably, the immersion is into hot water for between 60° C. and 66° C. for between 25 seconds and 50 seconds.

According to preferred embodiments of the method of the invention the carcass is immersed into hot water by being immersed in hot water held in a decontamination bath according to the second aspect of the invention and described herein. However, according to other embodiments of the invention the carcass may not be immersed in the hot water, but may instead by subjected to the hot water by passing through a hot water spray, for example a hot water spray of between 80° C. and 95° C. for 1 to 5 seconds (for example for less than 2 seconds).

According to a second aspect of the invention there is provided apparatus for reducing surface microbial contamination of poultry carcasses comprising a scald bath station, a de-feathering station, an evisceration station, a rinse station and an overhead conveyor for conveying successively poultry carcasses through each station, characterised in that the apparatus further comprises a decontamination bath adapted to contain hot water of between 50° C. and 75° C. and wherein the overhead conveyor is arranged to convey the defeathered poultry carcasses into, through and out of the decontamination bath such that the carcasses are each immersed for a time period of between 20 seconds and 120 seconds. According to certain preferred embodiments the decontamination bath is adapted to contain hot water of between 60° C. and 66° C., and the overhead conveyor is arranged such that the carcasses are each immersed for a time period of between 25 seconds and 50 seconds.

Order of Process Steps.

A key feature of all aspects of the invention is that the carcass is decontaminated by being subjected to hot water, for example by immersion into a decontamination bath, after it has been de-feathered (ie after it was been subjected to a defeathering primary scald and mechanical defeathering).

It is preferred that the decontamination takes place after the evisceration step and the post-evisceration rinse step also, but this is not essential. Accordingly, in preferred embodiments of the invention there is provided a method of reducing surface microbial contamination of a poultry carcass comprising subjecting the poultry carcass, which has been previously scalded de-feathered, eviscerated and rinsed to hot water of between 50° C. and 95° C. for between 1 second and 120 seconds. There is also provided a method of reducing surface microbial contamination of a poultry carcass comprising immersing the poultry carcass, which has been previously scalded de-feathered, eviscerated and rinsed into hot water of between 50° C. and 75° C. for between 1 second and 120 seconds There is also provided a method of reducing surface microbial contamination of a poultry carcass comprising immersing the poultry carcass, which has been previously scalded de-feathered, eviscerated and rinsed into hot water of between 60° C. and 66° C. for between 25 second and 50 seconds In the second aspect of the invention there is also provided apparatus for reducing surface microbial contamination of poultry carcasses comprising a scald bath station, a de-feathering station, an evisceration station, a rinse station and an overhead conveyor for conveying successively poultry carcasses through each station, characterised in that the apparatus further comprises a decontamination bath adapted to contain hot water of between 50° C. and 75° C. and wherein the overhead conveyor is arranged to convey the rinsed poultry carcasses into, through and out of the decontamination bath such that the carcasses are each immersed for a time period of between 20 seconds and 120 seconds.

There is also provided apparatus for reducing surface microbial contamination of poultry carcasses comprising a scald bath station, a de-feathering station, an evisceration station, a rinse station and an overhead conveyor for conveying successively poultry carcasses through each station, characterised in that the apparatus further comprises a decontamination bath adapted to contain hot water of between 60° C. and 66° C. and wherein the overhead conveyor is arranged to convey the rinsed poultry carcasses into, through and out of the decontamination bath such that the carcasses are each immersed for a time period of between 25 seconds and 50 seconds.

Water Temperature and Immersion Time.

According to all aspects of the invention and according to embodiments where the carcass is immersed in hot water, rather than being sprayed with hot water to achieve decontamination, it is preferred to avoid a water temperature which is so high so as to cause damage to the carcass surface (either melting and loss of subcutaneous fat and/or visible damage to the surface). However, the water temperature should be high enough to cause meaningful decontamination of the surface. Damage to the carcass may be avoided by either using a lower temperature and/or by reducing the immersion time. So it is to be understood that whilst 50° C. to 120° C. (and preferably 60° C. to 66° C.) is the water temperature according to these embodiments of the invention and that whilst the immersion time according to these embodiments of the invention is from 20 seconds to 120 seconds (preferably from 25 seconds to 50 seconds), the combination of water temperature and immersion time may also be functionally defined within the ranges disclosed herein as being such as to avoid significant loss of carcass mass or degradation to the cosmetic appearance of the surface whilst reducing surface contamination by a significant amount (for example at least a 0.5, 0.7, 0.8, 1, 1.2, or 1.5 log reduction) Combinations of water temperature and immersion times according to these embodiments of the invention include the following ranges:

65° C. to 75° C. for between 20 seconds and 60 seconds (for example for between 20 seconds and 50 seconds)

60° C. to 70° C. for between 20 seconds and 100 seconds (for example for between 30, 40 or 50 seconds and 90 or 100 seconds)

55° C. to 65° C. for between 40 seconds and 100 seconds (for example for between 50 seconds and 80 seconds)

50° C. to 60° C. for between 80 seconds and 120 seconds (for example for between 100 seconds and 120 seconds)

According to embodiments where the carcass is subjected to decontaminating hot water by being sprayed with hot water, the temperatures used are typically higher and the contact time shorter. For example a water temperature of between 80° C. and 95° C. may be used with a contact time of between 1 second and 5 seconds.

Poultry

The present invention in all aspects is applicable to all poultry including chickens, quails, turkeys, ducks and geese and also certain other birds which are sometimes regarded as poultry including guinea fowl, squabs and pheasants. The invention is especially applicable to poultry which is conventionally processed on an industrial scale using an overhead conveyor to convey carcasses between successive process stations and is also especially applicable to poultry which is prone to surface contamination with microbes which may be of potential concern from a food hygiene perspective. The invention in all aspects is especially applicable to ducks, turkeys and chickens, most especially chickens.

Poultry Processing

The steps of stunning, killing, scalding, de-feathering, eviscerating and rinsing poultry are well known in the art. A typical scald bath used for de-feathering poultry has a temperature of between 50° C. and 58° C. and an immersion time of about 4 minutes. The present invention relates to an additional step, subsequent at least the scalding and defeathering steps and preferably subsequent to all of the steps listed above, in poultry processing of subjecting the poultry carcass to hot decontamination water, optionally by spraying (see above for details of water temperature and contact times), but preferably by submerging the poultry carcass in a decontamination bath containing hot water of between 50° C. and 75° C. for between 20 seconds and 120 seconds (according to certain preferred embodiments of between 60° C. and 66° C. for between 25 seconds and 50 seconds). According to certain embodiments, the temperature of the hot water may be between 60° C. and 64° C., 62° C. and 66° C., or 62° C. and 64° C. and the immersion time may be between 25 seconds and 45 seconds, 30 seconds and 50 seconds or 30 seconds and 45 seconds. According to certain embodiments the water temperature is 60° C. to 64° C. and the immersion time is between 30 seconds and 45 seconds. Following immersion the carcass is lifted out of the decontamination bath. Preferably, the carcass is placed into and lifted out of the decontamination bath by an overhead conveyor onto which the carcass is held, for example by leg shackles.

Optionally, the carcass may be sprayed with water (preferably meeting the standards for potable water) after immersion in the decontamination bath to rapidly cool its surface and also wash off any debris which may have accumulated on the carcass. This water may be chilled or at ambient temperature (for example at room temperature or supply temperature) but in all cases will be at a lower temperature than the temperature of the decontamination bath or decontaminating spray water. As an optional alternative the carcass may be passed through an air blast chiller after immersion in the decontamination bath in order to rapidly cool its surface. Further chilling may of course also be employed subsequently to cool the whole product beyond its surface or to freeze the product. According to all aspects of the invention, the invention is especially applicable to poultry processing facilities wherein the carcass is conveyed on an overhead conveyor in which it is held by leg shackles. Preferably, the overhead conveyor is used to immerse the carcass in the decontamination bath (or alternatively, the decontamination hot water spray) after it has conveyed the carcass through preceding process steps. However, the invention also relates to use of a decontamination bath (or alternatively, the decontamination hot water spray) wherein the decontamination bath (or alternatively, the decontamination hot water spray) is not part of the same process line as that used for earlier procedures. For example, it encompasses a method wherein the de-feathering and/or evisceration is carried out on one line and the carcasses are then transferred to a second line for decontamination. However, in all cases, decontamination is to take place within a short time period of earlier processes, for example within 4 hours, 2 hours, 1 hour, 30 minutes or 10 minutes of defeathering and preferably also within those times of evisceration and rinsing. This short time interval ensures that microbial growth prior to decontamination (or alternatively, the decontamination hot water spray) is minimised. In preferred embodiments the carcass enters the decontamination bath within 100 seconds, for example within 80 or 60 or 40 seconds of the earlier processes (which typically end with a post evisceration rinse).

Poultry carcasses immersed in a decontamination bath in accordance with the invention may subsequently be fully chilled for packaging and cold-chain distribution or frozen for packaging and frozen distribution as "whole bird" products. In certain embodiments, the carcasses may be further prepared into a partially or fully prepared food product. For example, the carcass may optionally be jointed into separate pieces, for example, wings, breasts, drumsticks etc. Optionally, those pieces may be further processed, for example, they may be minced, moulded, marinated, breaded or coated to become products such as patties, kievs, kebabs, coated wings etc. It has been found that chicken carcasses subjected to decontamination in accordance with the present invention retain an acceptable cosmetic appearance in addition to showing reduced levels of microbial surface contamination. However, the decontamination step is none-the-less thought to have a small denaturation effect on the top most epidermal layer of the poultry skin especially when the decontamination step involves use of hot water of at least 60° C. as is preferred in accordance with the invention. Because this denaturation is slight and because the poultry is not subjected to significant rough handling, such as would be necessary for defeathering, after the decontamination step, it does not result in significant cosmetic degradation of the product. However, it has been discovered, that the when poultry joints or portions, for example wings, produced in accordance with the invention are handled by operators and/or machinery such as conveyors during the jointing process and/or when those joints or portions are agitated against each other during a marinade, coating or breading process step, enough of the denatured epidermis is dislodged such that although there may be no significant noticeable change to the product's cosmetic appearance, the surface as a result of handling and/or agitation becomes more amenable to being coated or breaded such that the breading or coating adheres better and is less likely to be lost in subsequent processing.

According to the first aspect of the invention there is provided a method with subsequent optional steps of jointing the carcass to produce poultry pieces (for example chicken wings). The method also provides optional further steps of breading, marinating or coating the poultry pieces. The breading, marinating and coating process steps will typically comprise gently agitating the poultry pieces in a container of marinade, coating or bread crumbs.

According to the second aspect of the invention there is provided apparatus with optional means to carry out the optional method steps described above.

Decontamination

The invention preferably relates to decontamination of carcasses of viable organisms such as enteric microflora bacteria. Organisms of relevance include, but are not limited to, coliform bacteria, Enterobacteriaceae, *E. coli*, *Pseudomonas* spp., *Campylobacter* spp., *Shigella* spp., *Listeria* spp., *Salmonella* spp. and/or *Clostridium perfringens*. According to certain embodiments, the invention provides an overall reduction in viable bacterial count on the surface of the poultry. According to other embodiments, the invention provides a reduction in viable count of a specific class of organism on the surface of the poultry. The invention may provide a reduction in viable *Salmonella* spp. or in viable *Campylobacter* spp. count on the surface of the poultry. Additionally, the invention may provide a reduction in viable avian influenza contamination on the surface of the poultry.

The extent of microbial contamination of a carcass may be assessed by a conventional sampling and quantitative or semiquantitative microbe detection process. Microbial counts are typically expressed on a log scale. Preferably, the methods and apparatus of the invention result in average surface contamination reductions of carcasses. For example, according to certain embodiments, surface contamination with a specific class of organism is reduced on the average carcass at least 1 log (10-fold), 2 log (100-fold) or 3 log (1000-fold) compared with carcasses processed on the same line but with the omission of the decontamination bath (or alternatively, the decontamination hot water spray).

Alternatively, the proportion of carcasses which are regarded as heavily contaminated with a specific class of organism is at least halved, more preferably reduced by 80, 90, 99 or 100% compared with carcasses processed on the same line but with the omission of the decontamination bath (or alternatively, the decontamination hot water spray). "Heavily contaminated" may be defined as above 1,000 cfu/g of skin sample or alternatively as above 500 cfu/g or 200 cfu/g or 100 cfu/g of skin sample.

Preferably, the overhead conveyor is arranged to convey the carcass through the decontamination bath from one end to the other end. The speed of the conveyor and the length of the conveyor above the bath determining the total immersion time. Alternatively, the overhead conveyor may convey the carcass through the decontamination bath from one end to the other around a bend and back again to the first end. The layout of the bath and the conveyor may be conveniently adapted to the space available in the plant.

The present invention runs the risk of significantly increasing water and energy consumption of the plant. In order to mitigate this, according to preferred embodiments of both aspects of the invention, the hot water used in the decontamination bath (or alternatively, the decontamination hot water spray) may be recycled for use in the scald bath. This is preferred to the alternative of reusing water from the scald bath in the decontamination bath (or alternatively, the decontamination hot water spray). Before being re-used the water may be filtered, clarified and/or cleaned and may be supplemented with additional input water to adjust temperature and/or volume as required. Additionally or alternatively, energy and water consumption may be minimised by recycling the decontamination bath water through water cleaning means before reintroducing it back into the decontamination bath. Additionally or alternatively, the water in the decontamination bath may be continually renewed in order to keep it clean. One suitable arrangement may be for the decontamination bath to have an inflow at one end and an outflow at the other end. Such an arrangement results in a flow of water along the length of the bath. The direction of flow may be counter-current to the direction in which a carcass is conveyed through the bath. This results in the carcass emerging from the end of the bath with the cleaner water and having its final contact with this cleaner water. It has also been found, however, that alternative arrangements are suitable, for example where the carcass is conveyed through the bath from one end to the other, round a bend and back again to the first end. The apparatus arrangement of the conveyors will, in part, depend on the space available within the premises.

It will be appreciated that continual renewal of the water in the decontamination bath has the potential to cause high consumption of water and energy. According to some preferred embodiments, therefore, the water in the decontamination bath is not continually renewed, but instead is used for a period of several hours, for example up to 2, 4, 6, 8, 10, 12, 14, 16, 18, 20, 22 or 24 hours or at least 2, 4, 6, 8, 10, 12, 14, 16, 18. 20, 22 or 24 hours. To prevent the water from becoming heavily contaminated during that time it is preferably cleaned by one or more cleaning means. The preferred cleaning means disclosed herein are a screen for surface water and a means for removing debris from the bottom of the decontamination tank. It is especially preferred to use, in combination, a screen for surface water and a means for removing debris from the bottom of the decontamination bath. The use of this combination is based on the observation that most of the debris that accumulates in the bath is either floating on, or near, the surface, or sunk to the bottom of the tank and that by targeting debris in those two regions of the tank, hygiene of the water in the decontamination tank may be substantially maintained.

Further details of surface water screens and means for removing debris from the bottom of the decontamination tank are given below, especially by reference to FIGS. 4 and 5.

The decontamination bath should be temperature controlled in order to maintain its temperature within acceptable parameters. According to certain embodiments the decontamination bath is temperature controlled by use of a proportional integral derivative (PID) controller. Various methods of maintaining an appropriate and even temperature are well known in the field of scald baths and include the provision of mixing means. Such technology may be applied to the decontamination bath of the present invention as required. According to certain embodiments, the decontamination bath is agitated with bubbles to assist with efficient heat transfer to the carcass surface. Alternatively, specific mixing means may not be required. This is especially true when top-up water is supplied to the bath via a means, such as a steam injector, which ensures agitation and mixing of the water in the tank without further mixing means being required. The temperature of the water may be maintained by an automatic thermostatic system, such as heaters in the bath or the injection of hot water or steam into the bath may be used to raise the temperature of the bath as required in order to achieve the target temperature.

It is envisaged that, even when used in configurations wherein the water in the decontamination bath is not continually renewed, a certain amount of top-up water will need to be added, either continually or periodically in order to maintain the correct level of water in the bath and so as to make up for water lost during use, for example to compensate for water carried out of the bath on the carcasses.

According to certain embodiments, the water of the decontamination bath may be supplemented with a decontamination agent such as chlorine. However, use of chlorinated water is outlawed in many jurisdictions, including the EU due to health concerns, and in many embodiments the water is not supplemented with additional decontamination agents and is derived from water of drinking water quality, for example from a municipal water supply and therefore has no more chlorination than the minimal levels permitted by potable water standards. In other embodiments the water is not drawn from a municipal supply and instead comes from a private supply, such as a private bore hole. However, such water will preferably have been tested and found to be, or treated to bring it up to, potable water standards.

Further details of the invention will be described by reference to the figures.

Figure 1:
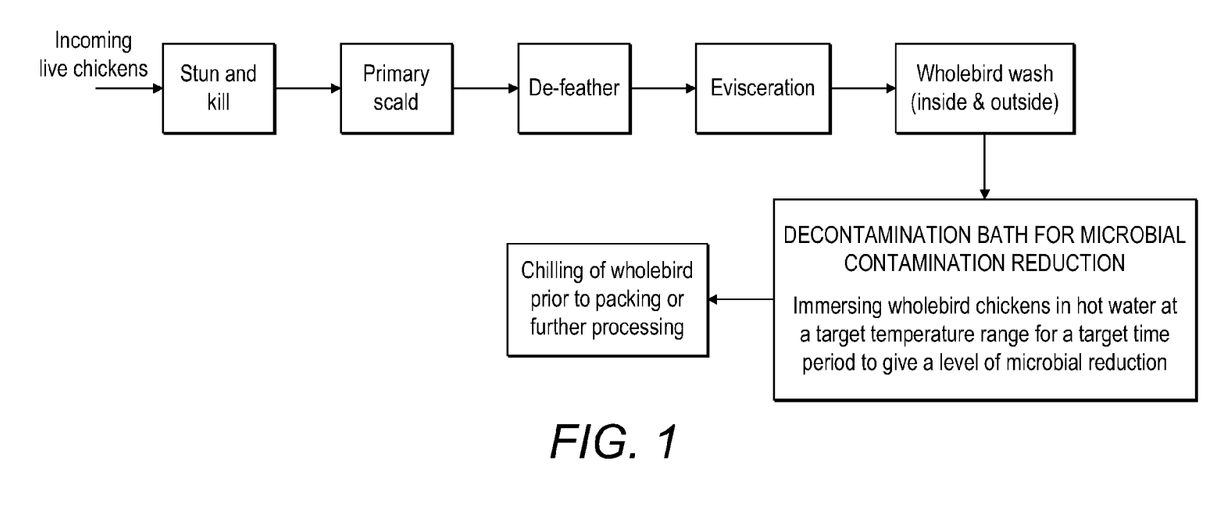
FIG. 1 shows how a method of one embodiment of the invention may be fitted into a process for producing chicken meat.

FIG. 1 shows a simplified process line relating to an embodiment of the invention. It can be seen that the carcasses progress from each operation to the next. As illustrated, the process takes live chickens as its input, stuns and kills them, scalds them, de-feathers them and eviscerates them. Whole carcasses are then washed (rinsed) in fresh cold water, inside and out, before being decontaminated in the decontamination bath, optionally sprayed with water, for example chilled water (not shown) and then chilled, frozen and packed or taken for further processing. Methods according to the invention may optionally further include any of the steps shown in the figure. For example, the method may optionally include one or more of stunning, killing, primary (defeathering) scalding, eviscerating and washing steps before the decontamination bath, and/or may optionally include steps downstream of the decontamination bath including chilling, freezing and/or packaging steps. Apparatus according to the invention may similarly include optional means for carrying out one or more of these upstream or downstream steps.

Figure 2:
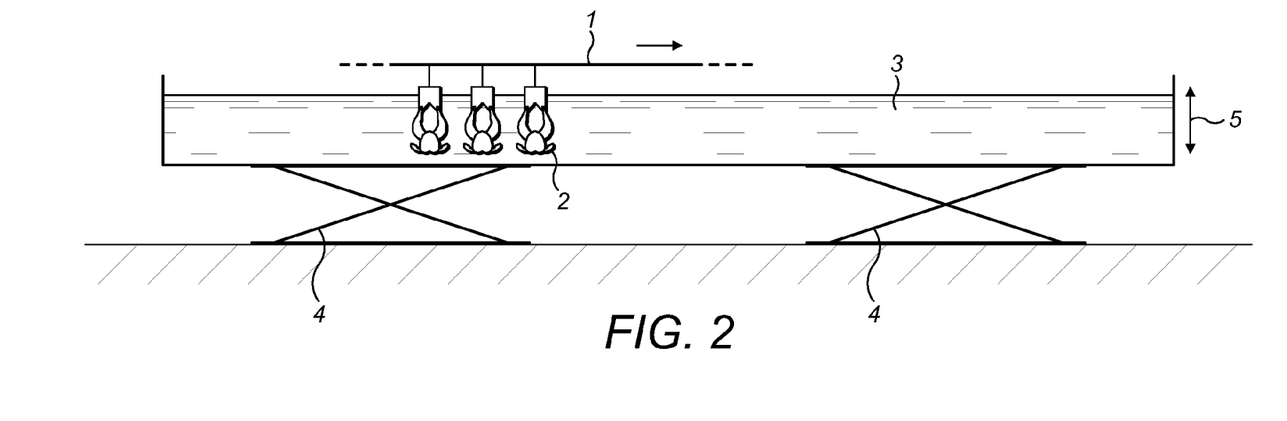
FIG. 2 shows an optional arrangement of a decontamination bath which provides a means to prevent damage to carcasses.

FIG. 2 shows a possible arrangement of a decontamination bath 3. Carcasses 2 are conveyed on an overhead conveyor (shown in part only) through the decontamination bath 3 from one end to the other. The apparatus is arranged so that the carcasses pass through the decontamination bath at a speed which ensures immersion of between 20 and 120 seconds, for example between 25 seconds and 50 seconds. Such an immersion time results in significant reductions in microbial contamination of carcass surfaces. However, immersion for longer time periods will result in damage to the carcass as it begins to cook. If the overhead conveyor is stopped, for example due to a problem or breakdown in another part of the process, there is a danger that the carcasses will remain immersed for too long and this will potentially result in damage to the carcasses and the risk that they may need to be disposed of, which represents a waste of food and an economic loss. To mitigate this, according to certain embodiments the decontamination bath may be moveable up and down (5), such that when it is in the up position the carcasses are fully immersed and when it is in the down position the carcasses are not immersed. Movement between the two positions may be achieved by any convenient means, but one preferred option is to support the decontamination bath on one or more scissor lifts, which are able to raise or lower the decontamination bath. Preferably, the apparatus is arranged such that, in response to the stoppage or slowing of the line, the decontamination bath is automatically lowered to prevent carcass damage.

Figure 3:
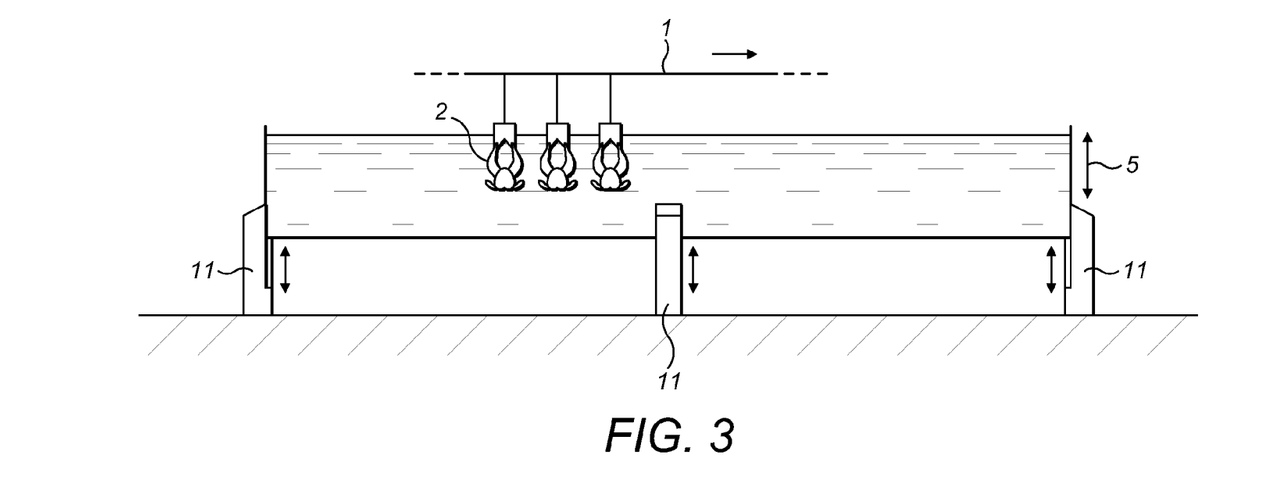
FIG. 3 shows an alternative arrangement of a decontamination bath which provides a means to prevent damage to carcasses.

FIG. 3 shows an alternative arrangement of a decontamination bath 3. In an alternative to the arrangement shown in FIG. 2, movement between the two positions is achieved using hydraulic rams 11. Further alternatives, not illustrated, include pneumatically activated movement of the bath between the two positions.

Figure 4:
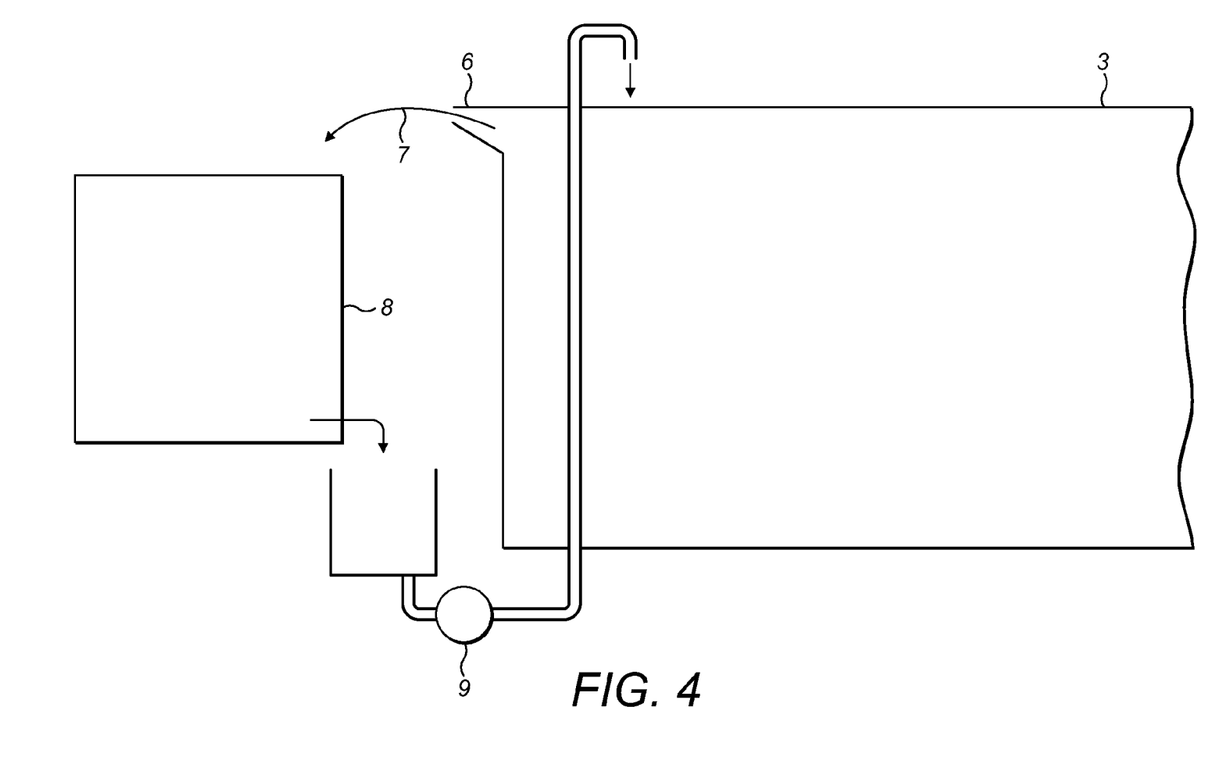
FIGS. 4 and 5 show diagrammatically optional arrangements of a decontamination bath to improve the hygiene of the water of the decontamination bath. The arrangements are, respectively a screening system for floating debris and a retrieval system for sinking debris.

FIG. 4 shows diagrammatically one arrangement for screening of surface water. The decontamination bath 3 bath is allowed to overflow via an overflow means 6 (channel, pipe or the like), and the water overflowing (illustrated diagrammatically by arrow 7) carries floating debris out of the bath. This water is then returned to the bath 3 after being screened to remove at least some of the floating debris. The screen may be carried out by any suitable means, for example by use of perforated or mesh screens. The apparatus may accordingly be provided with water screening means 8, a circulating pump 9, and water return means 10.

Figure 5:
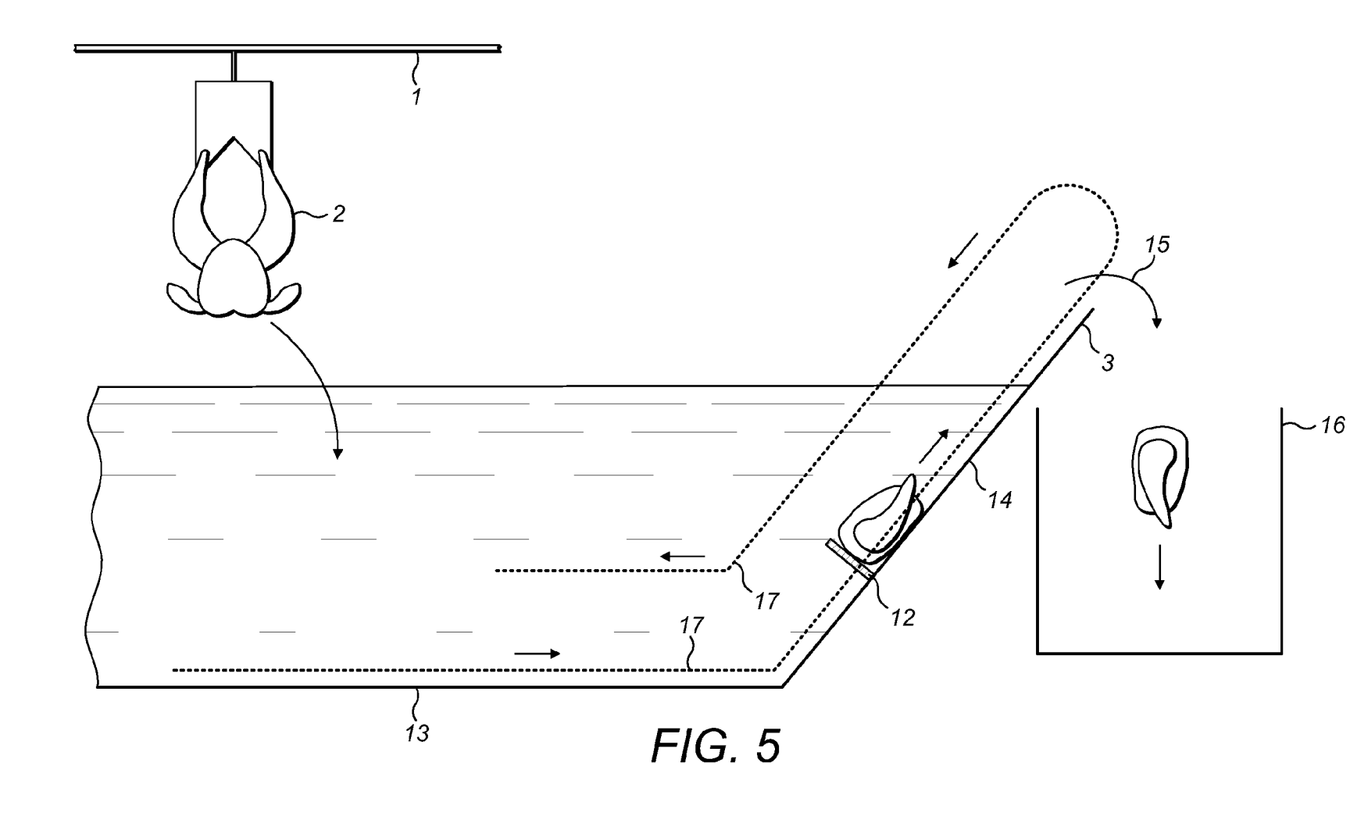

FIG. 5 shows diagrammatically one arrangement for removing sunk debris from the bottom of the bath. Such an arrangement is preferably sufficient to remove whole birds 2 which may accidentally fall from the shackles of the conveyor 1. It may also be suitable for handling smaller sunk debris. One arrangement involves providing a scraper blade which is pulled across the bottom surface 13 of the bath collecting fallen debris as it goes. The blade then travels up an inclined slope 14 to the top of the bath, thereby removing the debris from the bath. The removed debris may conveniently drop 15 into a container, for example a tote bin 16 for disposal. The scraper blade may be transferred across the surface of the tank by any convenient means. One option is to arrange for it to be pulled by a continuous motor driven chain 17. The invention encompasses arrangements with multiple scraper blades on the chain, but usually a single blade making at least one pass along the bottom surface of the tank every 10, 5 or 3 minutes is sufficient.

EXAMPLES

Apparatus and methods according to the invention were used to process chicken carcasses from the Applicant's existing processing line in order to examine the effect of apparatus and methods according to the invention on microorganisms comprising the enteric microflora of poultry. Carcasses processed with the use of a decontamination bath and subsequent air chiller were compared with carcasses processed without the use of a decontamination bath nor an air chiller. Samples of neck skin were taken from the carcasses and subjected to industry standard microbial assays for *Campylobacter* spp., total Enterobacteriaceae, and *E. coli*.

Figure 6:
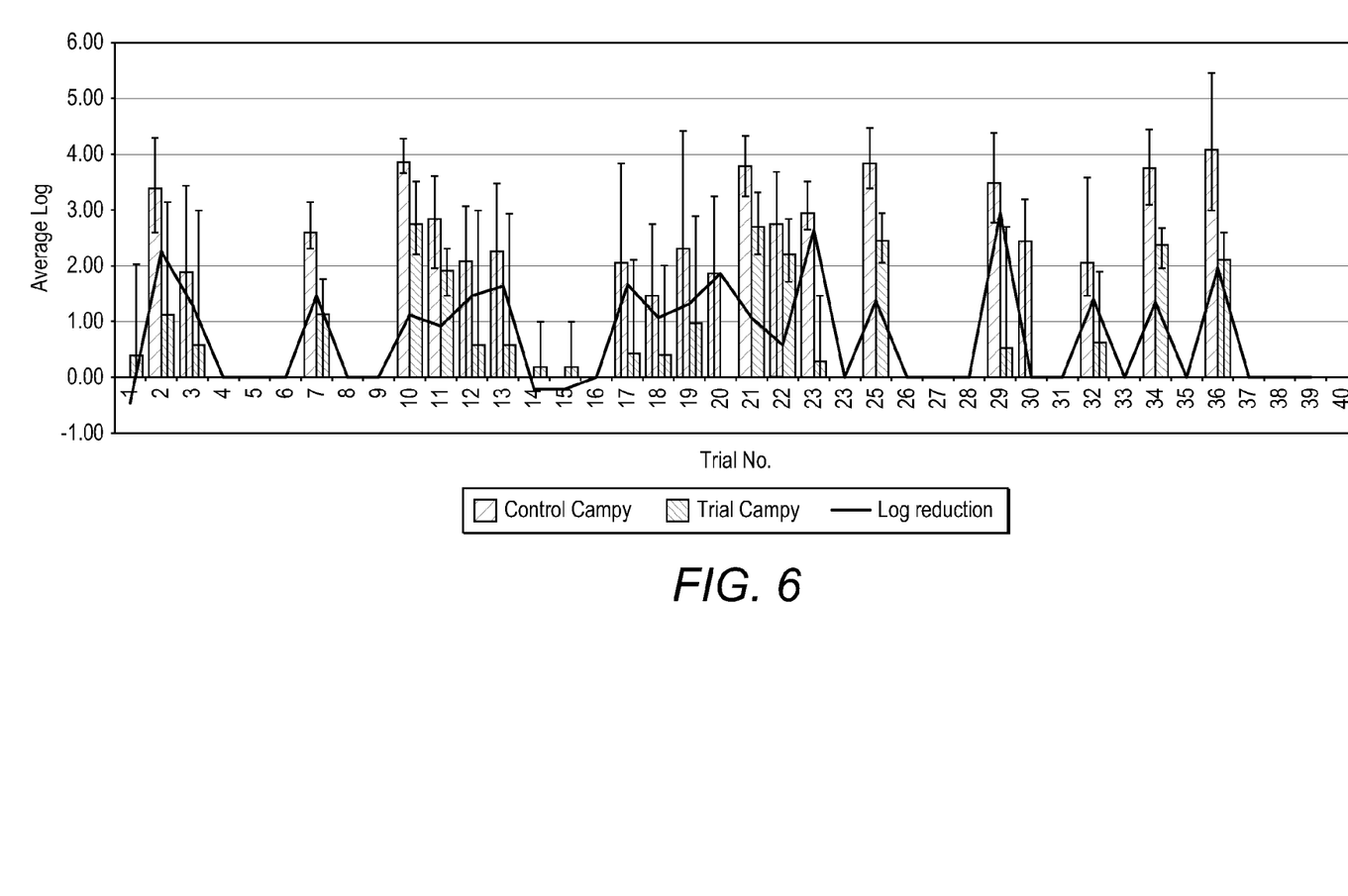
FIG. 6 shows levels of pre and post treatment *Campylobacter* contamination on chicken skin.
Figure 7:
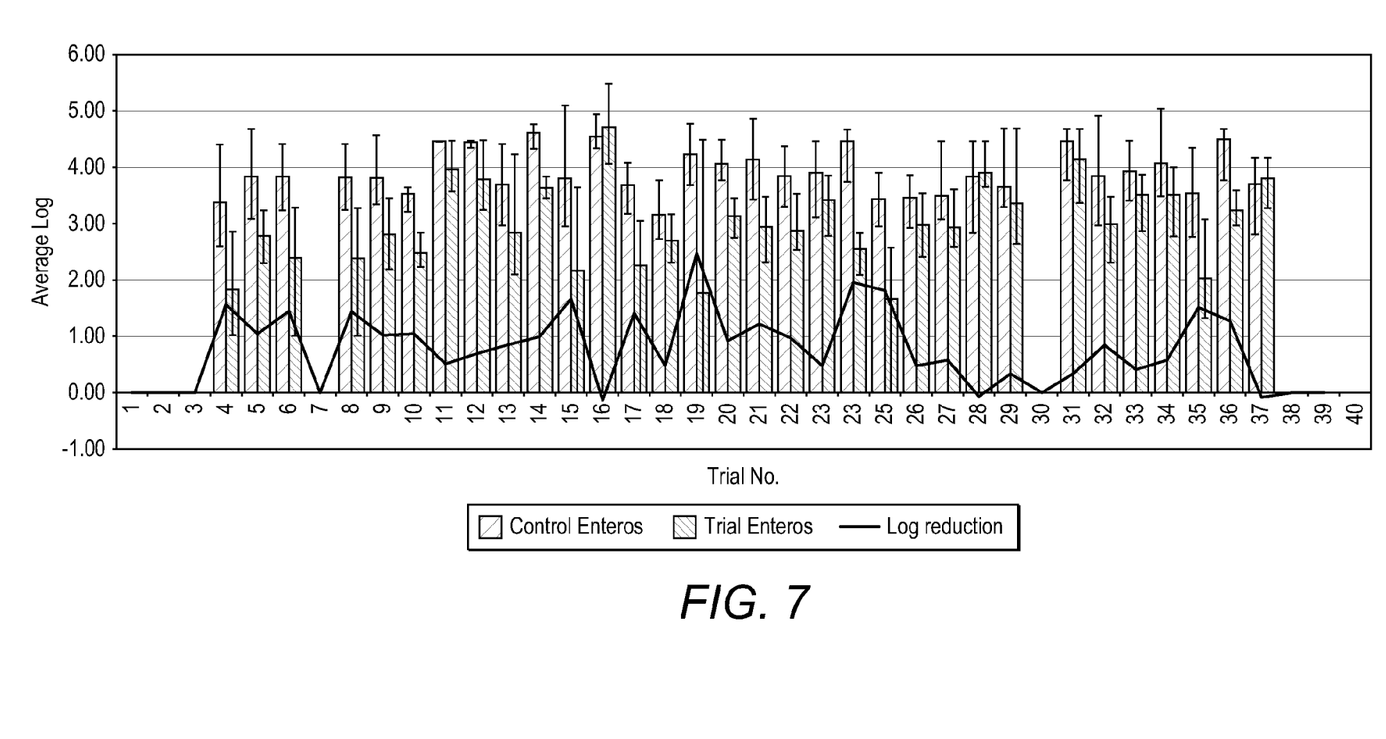
FIG. 7 shows levels of pre and post treatment Enterobacteriaceae contamination on chicken skin.
Figure 8:
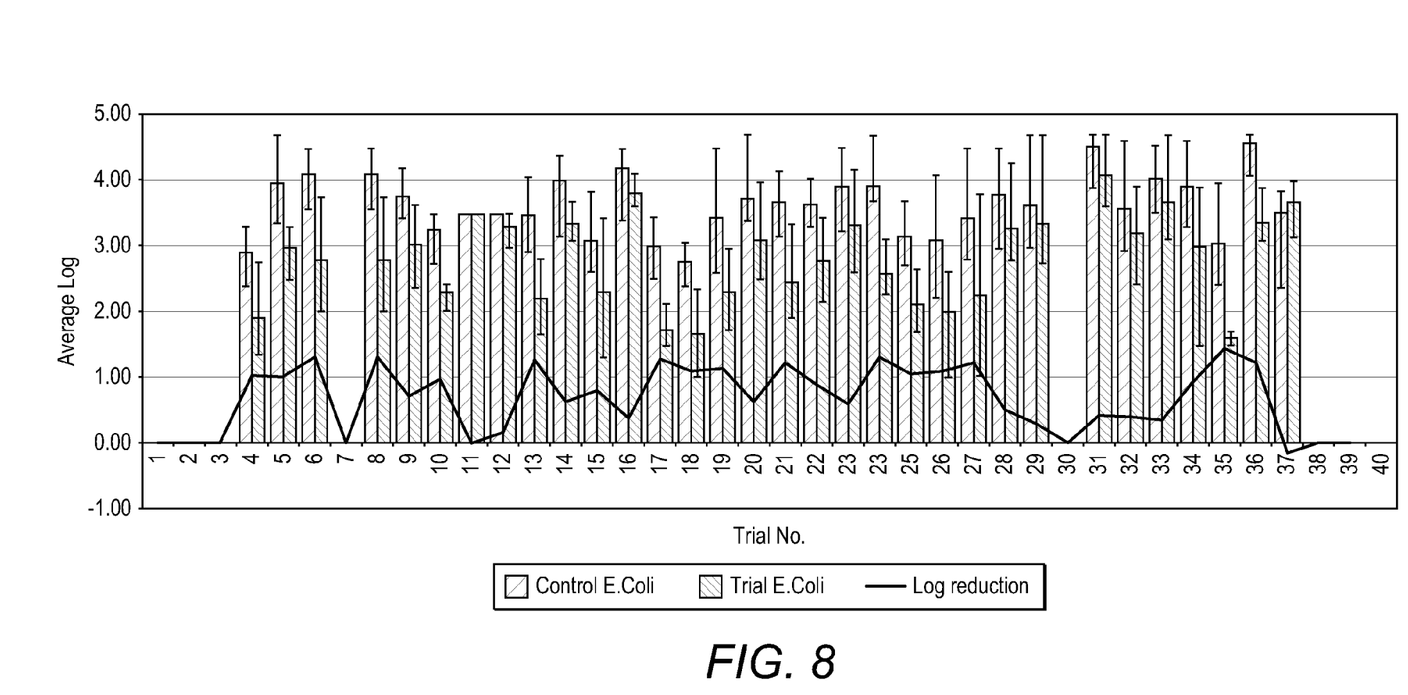
FIG. 8 shows levels of pre and post treatment *E. coli* contamination on chicken skin.

FIGS. 6, 7 and 8 show, respectively, the data for *Campylobacter* spp., total Enterobacteriaceae, and *E. coli*. The bar graph of the figures shows pairs of bars, each representing a group of 25 carcasses tested. The 25 carcasses were grouped into 5 groups of 5 and neck skin samples pooled within each group. The first bar shows the microbial level for control carcasses not subjected to the decontamination bath and the second bar shows the level for carcasses subjected to decontamination bath treatment. As can be seen, the second bar is always lower than the first, indicating that the decontamination bath reduces surface contamination for all three organisms examined.

Additionally, a further larger scale test was carried out by an independent laboratory and adjudicated by the University of Ulster. In addition to comparing bacterial counts without intervention with those on carcasses subject to a decontamination bath according to the invention and an air chiller, a third group which had been subjected to the chiller, but not the bath, was assessed.

The values were measured both immediately after intervention and following 5 days stored chilled in a retail package. A summary of the data for this trial is shown below.

| Intervention | Average log | Min | Max |
|---|---|---|---|
| None | 3.14 | 0.00 | 5.21 |
| Bath and chill | 1.72 | 0.00 | 4.11 |
| Bath and chill and 5 day retail pack | 0.48 | 0.00 | 1.60 |
| Chill only | 2.36 | 1.70 | 3.24 |
| Chill only and 5 day retail pack | 1.55 | 1.00 | 4.12 |

Statistical analysis showed that difference between no intervention and the decontamination bath, and between no intervention and the decontamination bath followed by air chiller was very highly significant (P<0.0001)

What is claimed is:

1. A method of reducing surface microbial contamination of a poultry carcass comprising:
    subjecting the poultry carcass which has previously been scalded and de-feathered to a hot water spray of between 80° C. and 95° C. for between 1 second and 5 seconds.

2. A method of reducing surface microbial contamination of a poultry carcass comprising:
    immersing the poultry carcass which has previously been scalded and de-feathered into a decontamination bath containing hot water of between 50° C. and 95° C. for between 1 second and 120 seconds.

3. A method of reducing surface microbial contamination of a poultry carcass according to claim 2 comprising:
    immersing the poultry carcass which has previously been scalded, de-feathered, eviscerated and rinsed into the decontamination bath containing hot water of between 50° C. and 75° C. for between 20 seconds and 120 seconds.

4. A method of reducing surface microbial contamination of a poultry carcass according to claim 3 comprising:
    immersing the poultry carcass which has previously been scalded, de-feathered, eviscerated and rinsed into a decontamination bath containing hot water of between 60° C. and 66° C. for between 25 seconds and 50 seconds.

5. A method according to claim 2 wherein the method is followed by spraying the poultry carcass with water to cool its surfaces.

6. A method according to claim 2 wherein the method is followed by passing the poultry carcass though an air chiller to cool its surfaces.

7. A method according to claim 2 wherein the poultry carcass is conveyed on an overhead conveyor in which the poultry carcass is held in leg shackles and the poultry carcass is immersed into the hot water for between 20 and 120 seconds by being conveyed into the decontamination bath at a first end of the decontamination bath, by being conveyed along the length of the decontamination bath and by being conveyed out of the decontamination bath at a second end of the decontamination bath, wherein the decontamination bath contains the hot water.

8. A method according to claim 7, wherein the hot water enters the decontamination bath at the second end and exits the decontamination bath at a first end such that a flow of hot water is established along the length of the decontamination bath in the opposite direction to the movement of the carcass through the decontamination bath.

9. A method according to claim 7 wherein the poultry carcass has been rinsed less than 10 minutes previously.

10. A method according to claim 7 wherein the overhead conveyor has previously conveyed the carcass through de-feathering, evisceration and carcass rinsing processes.

11. A method according to claim 7 wherein the hot water used to immerse the poultry carcass is subsequently used in a scalding bath for scalding further poultry carcasses prior to their de-feathering.

12. A method according to claim 7 wherein the hot water used to immerse the poultry carcass is screened to remove floating debris and returned to the decontamination bath.

13. A method according to claim 7 wherein the decontamination bath containing hot water is arranged to be lowered such that the carcass held by leg shackles on an overhead conveyor is no longer immersed in the hot water, in response to a stoppage or slowing of the overhead conveyor.

14. A method according to claim 2 wherein the poultry carcass is a chicken carcass.

15. Apparatus for reducing surface microbial contamination of poultry carcasses comprising a scald bath station, a defeathering station, an evisceration station, a rinse station and an overhead conveyor for conveying successively poultry carcasses through each station characterized in that the apparatus further comprises a decontamination bath containing hot water of between 50° C. and 75° C. and wherein the overhead conveyor is arranged to convey the defeathered poultry carcasses into, through and out of the decontamination bath such that the carcasses are each immersed for a time period of between 20 seconds and 120 seconds (preferably between 25 seconds and 50 seconds).

16. Apparatus according to claim 15, further comprising a spray station for spraying the carcasses with water after emergence from the decontamination bath wherein the overhead conveyor is arranged to convey the carcasses to the chiller station.

17. Apparatus according to claim 15, further comprising an air chiller station for chilling the surface of the carcass after emergence from the decontamination bath wherein the overhead conveyor is arranged to convey the carcasses to the air chiller station.

18. Apparatus according to claim 15 wherein at least some of the hot water from the decontamination bath is re-used in the scald bath.

19. Apparatus according to claim 15 wherein at the apparatus further comprise means to remove floating debris from the decontamination bath and/or means to remove sunk debris from the decontamination bath.

20. Apparatus according to claim 15 wherein the decontamination bath is arranged that, in the event of a stoppage of the overhead conveyor, it is automatically lowered in order to prevent carcasses from remaining submerged in the decontamination bath for sufficiently long to result in damage to the carcass meat quality.

* * * * *